(12) United States Patent
Bapat et al.

(10) Patent No.: US 9,106,482 B1
(45) Date of Patent: Aug. 11, 2015

(54) SYSTEMS AND METHODS FOR PROXY-LESS LOAD BALANCING

(75) Inventors: Shashank Bapat, Fremont, CA (US);
Alok Kumar, Fremont, CA (US);
Sreedhar Mukkamalla, San Francisco, CA (US); Uday Naik, Fremont, CA (US)

(73) Assignee: Google Inc., Mountain View, CA (US)

( * ) Notice: Subject to any disclaimer, the term of this patent is extended or adjusted under 35 U.S.C. 154(b) by 460 days.

(21) Appl. No.: 13/556,575

(22) Filed: Jul. 24, 2012

(51) Int. Cl.
*G06F 15/173* (2006.01)
*H04L 29/08* (2006.01)

(52) U.S. Cl.
CPC .... *H04L 29/08216* (2013.01); *H04L 29/08144* (2013.01); *H04L 67/1019* (2013.01)

(58) Field of Classification Search
CPC ............ H04L 67/1019; H04L 67/1004; H04L 29/08144; H04L 29/06; H04L 29/08072; H04L 29/08171; H04L 12/5695; H04L 29/08216
USPC .......................................... 709/226, 220–222
See application file for complete search history.

(56) References Cited

U.S. PATENT DOCUMENTS

| | | | |
|---|---|---|---|
| 5,644,720 A * | 7/1997 | Boll et al. ...................... | 709/227 |
| 6,925,490 B1 * | 8/2005 | Novaes et al. ................. | 709/219 |
| 2010/0042668 A1 * | 2/2010 | Liang et al. ................... | 709/201 |

* cited by examiner

*Primary Examiner* — Jude Jean Gilles
*Assistant Examiner* — Abdulkader M Alriyashi
(74) *Attorney, Agent, or Firm* — Edward A. Gordon; Foley & Lardner LLP (57) ABSTRACT

Load balancing in a server pool may be achieved by rebalancing subsets of backend servers allocated to frontend servers. The rebalancing may be achieved by determining a max and min subset of servers and transferring backend servers between the subsets.

20 Claims, 4 Drawing Sheets

SYSTEMS AND METHODS FOR PROXY-LESS LOAD BALANCING

BACKGROUND OF THE INVENTION

Internet services may be accessed by individuals or client machines by issuing requests at the client machine that are transmitted to servers over a communications network. The server may act on the request and return the information to the requesting client machine. Multiple servers may be pooled to support multiple requests from various clients. One way to service network queries for a variety of software applications is to use several frontend servers to receive and hand off requests to a suitable backend server. One configuration for such an arrangement is to connect each of the backend servers to each frontend server and the frontend server sends traffic to the backend servers in a round robin. This configuration can require significant resource use due to fanning-in and fanning-out of network connections. It can also be problematic when the pools of frontend and backend servers are large.

Another approach is to use proxy servers to relay traffic between the frontend server pool and the backend server pool. Proxy servers typically only transfer data from one connection to another and can alleviate the problem of fanning in and out across network connections. However, the addition of one extra step between the frontend servers and backend servers can add latency to each request. In addition, managing and monitoring the proxy servers requires management overhead.

Another approach is to connect random subsets of backend servers to frontend servers. In ideal environments where all devices are working properly, the network load is distributed uniformly to similarly sized subsets of servers. However, if the selection of backend servers for each frontend server is not coordinated, there can be great variance in backend loads which can cause cascading failures. Although increasing the number of devices in the subsets can improve load distribution, the increased subset size can negate the benefit of using a subset rather than connecting each backend server to each frontend server.

Embodiments described herein can be used to improve efficiency of using subsets of servers in network balancing configurations.

SUMMARY OF INVENTION

In an aspect of the invention network load balancing may be achieved using systems and methods for balancing subsets of backend servers. Each of the backend servers may be assigned an index number. A subset of the plurality of backend servers may be allocated to one of a plurality of frontend servers. A size of the subsets of backend servers may be determined such that a size of a first subset of backend servers differs from a size of a second subset of backend servers. A backend may be transferred from the first subset to the second subset. The backend servers may be allocated to a subset using a random shuffling of its respective index number. A backend server may be identified to be transferred from the first subset to the second subset based on whether it is not included in the second subset, and its index number. The first subset may be the subset of backend servers having the greatest number of backend servers, and the lowest index number. The second subset may be the subset of backend servers having the lowest number of backend servers, and the highest index number. Determination of subset size and transferring backends between subsets may continue until the difference between the subset sizes meet a threshold value, such as 1.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

The following detailed description refers to the accompanying drawings. The detailed description does not limit the invention.

The present invention relates to network architecture for load balancing and can be used in any network environment to achieve the advantages described herein. Generally speaking, any environment using large pools of servers that communicate with other servers, for example internet services backend architectures, may use the load balancing techniques described herein.

Figure 1:
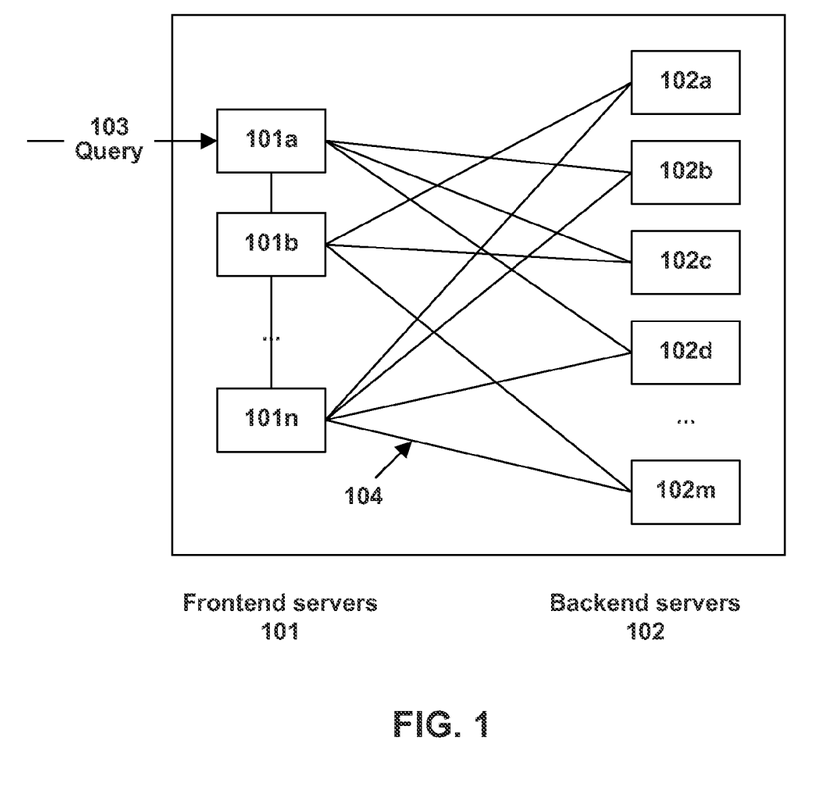
FIG. 1 is an exemplary diagram of a system for implementing an embodiment of the invention.

Distributing network traffic and load balancing can be achieved by allocating subsets of backends servers to frontend servers. FIG. 1 depicts an exemplary architecture in which a query 103 from a client (not shown) may be sent via a network, for example, the internet, is received by a frontend server 101a-n. Each of the frontend servers 101a-n may be connected to a subset of backend servers 102a-m via connections 104. Generally speaking frontend servers 101 and backend servers 102 may be any server, such as a computing device, that is capable of executing various software applications. The frontend server 101 may be used to respond to queries 103 from an associated subset of backend servers 102. The backend server 102 may be a server that is capable of providing data and information to front end 101 pertaining to query 103.

Generally speaking, backend servers 102 may be connected in subsets to one or more frontend servers 101. The pool of frontend servers 101 and backend servers 102, may have an approximately equal number of backend servers 102 connected to each frontend server 101. In such an arrangement, there is approximately the same number of servers available to provide services requested by query 103. If there are a disproportionate number of servers in subsets, then certain subsets may become overloaded. When backend servers 102 are unavailable, for example, due to an unexpected failure, or because of scheduled maintenance, such as software updates, when resources are taken offline for low utility periods, or when resources are brought back online, the subset sizes can change. In order to avoid problems with overloaded subsets and under utilizing resources, when subset sizes change, the pool of backend servers can be reassigned so that the network load balance remains constant. For scheduled maintenance, the subset sizes and assignments can change as each server is taken offline and reinstated again.

Allocation of backend servers can be managed using a network management controller (not shown) which can be implemented on a control device capable of communicating with and controlling associations of each of the backend servers 102 and frontend servers 101.

Figure 2:
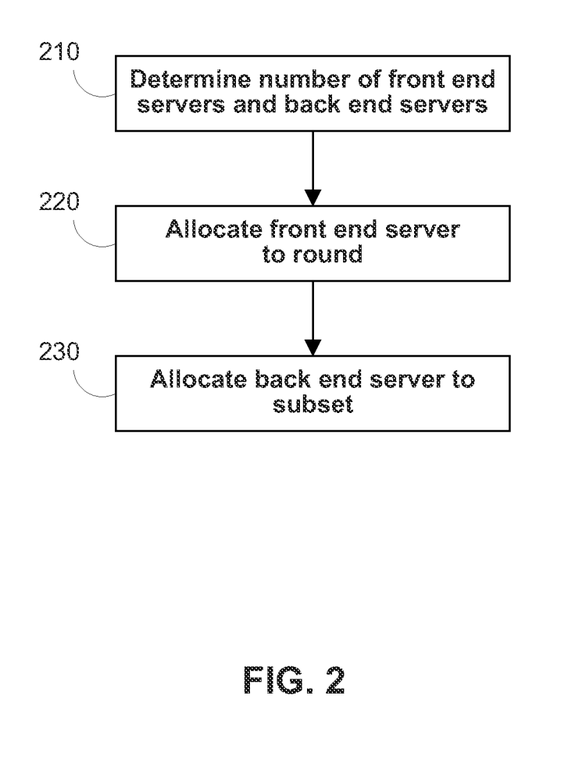
FIGS. 2-4 are exemplary processes for implementing an embodiment of the invention.

One method for allocating backend servers 102 to frontend servers 101 may follow the process shown in FIG. 2. As shown, the number of frontend servers 101 and backend servers may be determined at step 210. Step 210 may be performed by a network management controller which may have access to a database including information about devices in the server pools as well as state information about the devices. The network management controller may also have information indicating a maximum and minimum constraint for server connections. The frontend servers 101 and backend servers 102 may be shuffled before assigning each to a subset. One reason for shuffling the servers in advance of assignment is to enhance the randomization of the allocations and to avoid assigning certain devices that may be adjacent geographically, or serially in the network which may have, for example, consecutive task numbers.

The frontend servers 101 may be allocated to a round of N servers. The number N of frontend servers 101 allocated to each round may be determined independently by each of the front end servers 101 using the number of backend servers and the subset size K, or by the network management controller using network settings information, a number of backend servers, and a subset set size K. Each of the frontend servers 101 determines the round it is allocated to. An example of a round of frontend servers may be as follows:

TABLE A

Frontend Server Round

| | Subset 0 | Subset 1 | Subset 2 | Subset 3 |
|---|---|---|---|---|
| Round 0 | Frontend 0 | Frontend 1 | Frontend 2 | Frontend 3 |
| Round 1 | Frontend 4 | Frontend 5 | Frontend 6 | Frontend 7 |
| Round 2 | Frontend 8 | Frontend 9 | Frontend 10 | Frontend 11 |
| Round 3 | Frontend 12 | Frontend 13 | Frontend 14 | Frontend 15 |
| Round M | ... | | | |

The backend servers may be allocated to frontend server rounds at step 230 based on the following:

Each of the N frontends are assigned a unique index from zero to N−1. The M backends may be assigned a unique index from zero to M−1. The subset size is K. The subset for a specific frontend with index i (where i lies between zero and N−1).

DEFINITIONS subsets_per_round M/K—is the integer quotient of div(M, K). For example if there 100 backend servers (M) and subset size is 30 (K), then subsets_per_round is defined as the integer quotient of div(100, 30) or 3.

round_number for a frontend with index i as i/subsets_per_round i.e. the integer quotient of div(i, subsets_per_round). For example, if the frontend index is 16 and subsets_per_round is 3, then the round number for the frontend is the integer quotient of div(16, 3) or 5.

subset_within_round as the remainder of div(i,subsets_per_round). For example, if the frontend index is 16 and subsets_per_round is 3, then the subset_within_round is 1.

Using the round_number as a deterministic seed, the backend servers may be shuffled using a standard Knuth Shuffle algorithm, or other shuffle algorithm.

```
void KnuthShuffle(vector<int>*elements) {
ACMRandom random (round_number);
for (int i=number_of_backends; i>0; --i)
   swap((*elements)[i−1],
(*elements)[random.UnbiasedUniform(i)]);}
```

A random number may be generated in the function above—random.UnbiasedUniform(i)—from zero to i−1. Once the shuffle is completed, the shuffled elements may be divided into equal subsets of size K and the subset may be selected by index subset_with_round.

The above calculation may be used when the number of frontends is exactly divisible by the number of subsets per round to achieve 100% uniform loading. However, even if the number of frontends and the number of subsets per round were not exactly divisible, the difference between the number of frontends to which a backend is assigned may be 1, or in the worst case 2.

The above algorithm may be applied when the subset size K remains fixed for the lifetime of the servers. In real world deployment, however, the subset size K may need to grow or shrink for various reasons and in response to system constraints. In one example, the frontend server pool may be required to send traffic to multiple backend server pools (for example, in accordance with global load balancing policies). In another example, if there is a resource constraint on the overall number of connections that each frontend server can establish, then the subset size will need to shrink when the frontend pool connects to a larger number of backend pools. Generally speaking, the smaller the subset size, the higher the load variance on the backends and resilience to frontend/backend failures worsens. Dynamically growing or shrinking the subset size may be achieved as follows.

A minimum subset size may be calculated. For example, if the nominal subset size is 50, and if a system constraint is that each frontend may communicate with at most 8 different pools of backend servers. With 8 different pools, each frontend may use a subset size of 50/8=6 backends in each server pool, therefore, the minimum desired subset size is 6.

If the actual desired subset size (based on other system constraints) is equal to the minimum subset size, apply exactly the deterministic subsetting algorithm described above.

If the actual desired subset size is larger than the minimum subset size, a number of multiples of the minimum subset size (up to a maximum of 8, in the current example) may be computed. This number is num_shards so that the effective subset size is=num_shards*minimium subset size.

In one example, the actual desired subset size is 15. num_shards=desired subset size/minimum subset size=15/6=2. The subset that is output is computed by inputting the original subset (at minimum subset size) as well as one other subset/shard. If the desired subset size is 43 so that num_shards=43/6=7, the subset that is output is the original subset/shard plus 6 other subsets/shards. In this manner, a subset can be grown in integral multiples of the minimum subset size (up to, for example, a maximum of 8 multiples, in the above example). Increasing or growing a subset may happen using other subsets/shards in a given round.

One way for growing the subset by adding shards for a given frontend would be to use as many consecutive shards as required starting from the initially assigned shard. For example, with a FlexibleDeterministicSubset(num_backends=9, subset_size=4), the minimum_subset_size=min(1, 4/8)=1 subsets per round=num_backends/minimum_subset_size=9/1=9

An example of assigning shards in this manner is described with reference to the following Table B:

TABLE B

Backend servers in shards

| Subset Index within Round | 1st Shard | 2nd Shard | 3rd Shard | 4th Shard | 5th Shard | 6th Shard | 7th Shard | 8th Shard | 9th Shard |
|---|---|---|---|---|---|---|---|---|---|
| 0 | 0 | 1 | 2 | 3 | 4 | 5 | 6 | 7 | 8 |
| 1 | 1 | 2 | 3 | 4 | 5 | 6 | 7 | 8 | 0 |
| 2 | 2 | 3 | 4 | 5 | 6 | 7 | 8 | 0 | 1 |
| 3 | 3 | 4 | 5 | 6 | 7 | 8 | 0 | 1 | 2 |
| 4 | 4 | 5 | 6 | 7 | 8 | 0 | 1 | 2 | 3 |
| 5 | 5 | 6 | 7 | 8 | 0 | 1 | 2 | 3 | 4 |
| 6 | 6 | 7 | 8 | 0 | 1 | 2 | 3 | 4 | 5 |
| 7 | 7 | 8 | 0 | 1 | 2 | 3 | 4 | 5 | 6 |
| 8 | 8 | 0 | 1 | 2 | 3 | 4 | 5 | 6 | 7 |

Table B illustrates how subset shards may be selected for a given subset index. Each row number is the frontend index within the round and the contents of the row are a sequence of indices of shards to be included as the subset for that subset index. For example, if frontend_index=13
subset index within round=frontend_index % subsets_per_round=13% 9=4
If num_shards=1, subset=elements from shard 4
If num_shards=2, subset=elements from shards {4, 5}
If num_shards=3, subset=elements from shards {4, 5, 6}
If num_shards=4 (the max), subset=elements from shards {4, 5, 6, 7}

Table B is a Latin Square, i.e., it is an n×n array filled with n different numbers, each occurring exactly once in each row and exactly once in each column. One property of the Latin Square is that every shard occurs exactly once in every column. Thus, if all frontends in the round are present and the same number of shards is picked (i.e. using the same subset size), then all backends in the round are guaranteed to be covered exactly num_shard times, which is a uniform load across the backends.

The Latin Square approach may be used to grow or shrink a subset with minimal churn while maintaining a balanced load across backends when all frontends in a round are present. However, this approach suffers when a consecutive set of frontends in the round are absent. In this case, load distribution across the backends becomes skewed. The last round of frontends, in general, will be missing a set of consecutive frontends at the end of the list. This may happen, for example, when frontends are being updated).

For example, using the example in Table B, if there are only five frontends in the round and the current subset size is 3, so that there are 3 shards and such that Frontends 0-4 are present

| Subset Index with Round | 1st Shard | 2nd Shard | 3rd Shard | 4th Shard | 5th Shard | 6th Shard | 7th Shard | 8th Shard | 9th Shard |
|---|---|---|---|---|---|---|---|---|---|
| 0 | 0 | 1 | 2 | 3 | 4 | 5 | 6 | 7 | 8 |
| 1 | 1 | 2 | 3 | 4 | 5 | 6 | 7 | 8 | 0 |
| 2 | 2 | 3 | 4 | 5 | 6 | 7 | 8 | 0 | 1 |
| 3 | 3 | 4 | 5 | 6 | 7 | 8 | 0 | 1 | 2 |
| 4 | 4 | 5 | 6 | 7 | 8 | 0 | 1 | 2 | 3 |
| 5 | 5 | 6 | 7 | 8 | 0 | 1 | 2 | 3 | 4 |
| 6 | 6 | 7 | 8 | 0 | 1 | 2 | 3 | 4 | 5 |
| 7 | 7 | 8 | 0 | 1 | 2 | 3 | 4 | 5 | 6 |
| 8 | 8 | 0 | 1 | 2 | 3 | 4 | 5 | 6 | 7 |

As shown, backends 7 and 8 are no longer bearing any load because they are not assigned to any of the available frontends (frontends 0-4, frontends 5-8 are not available). Meanwhile, backends 0 and 6 only appear once, backends 1 and 5 appear twice, and backends 2-4 appear three times. This load balancing means that backends 2-4 have three times the load as backends 0 and 6, and backends 7 and 8 bear zero load. This arrangement will lead to poor load balancing.

Another way to balance the load may be performed using a variation of the above Latin Square where the backend sequence is rotated by a different amount to obtain a sequence for each row. The amount of rotation for the different rows may be deterministic based on round number, or some permutation of the sequence {0, 1, . . . N−1}.

TABLE C

Variation of Latin Square Backends in Shards

| Subset Index with Round | 1st Shard | 2nd Shard | 3rd Shard | 4th Shard | 5th Shard | 6th Shard | 7th Shard | 8th Shard | 9th Shard |
|---|---|---|---|---|---|---|---|---|---|
| 0 | 7 | 8 | 0 | 1 | 2 | 3 | 4 | 5 | 6 |
| 1 | 3 | 4 | 5 | 6 | 7 | 8 | 0 | 1 | 2 |
| 2 | 1 | 2 | 3 | 4 | 5 | 6 | 7 | 8 | 0 |
| 3 | 4 | 5 | 6 | 7 | 8 | 0 | 1 | 2 | 3 |
| 4 | 5 | 6 | 7 | 8 | 0 | 1 | 2 | 3 | 4 |
| 5 | 2 | 3 | 4 | 5 | 6 | 7 | 8 | 0 | 1 |
| 6 | 6 | 7 | 8 | 0 | 1 | 2 | 3 | 4 | 5 |
| 7 | 0 | 1 | 2 | 3 | 4 | 5 | 6 | 7 | 8 |
| 8 | 8 | 0 | 1 | 2 | 3 | 4 | 5 | 6 | 7 |

When backends become unavailable, for example due to crashes and restarts, or scheduled server updates, the backend pool may be dynamically resized to improve resource utilization. Rebalancing may be required when the subsets in the rounds are not substantially the same size. For example, a difference of 1 element between the largest and smallest subset may be considered substantially the same. A greater difference may indicate a load imbalance. Minimizing the load variance from unevenly sized backend subsets leads to greater load balancing.

Rebalancing the subsets may be accomplished by redistributing backends among various subsets within a round so that across a given round, the backend load is substantially uniform. Rebalancing within a round may be performed following the steps of FIG. 3.

Figure 3:
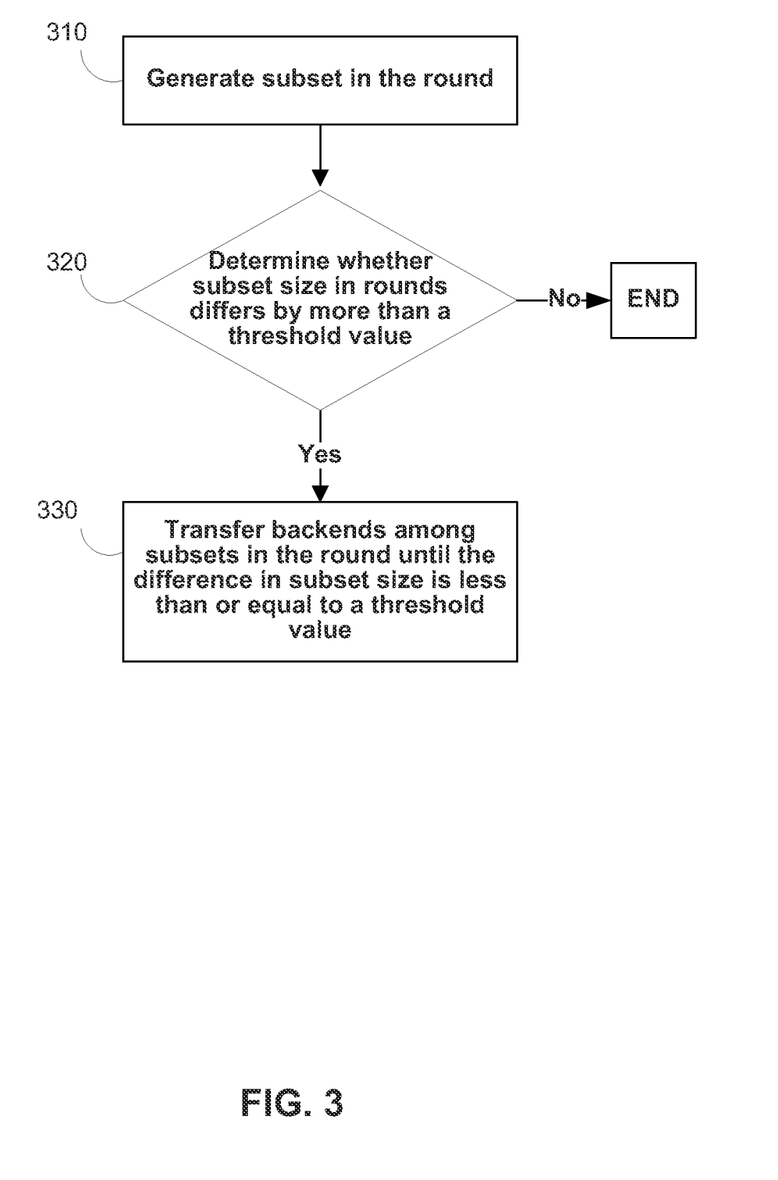

At step 310, subsets may be generated based on sizing obtained using a Latin square, variation, or other method. The subsets in the round may be determined by each frontend server as discussed above with reference allocation of backends to shards using a Latin Square or a Latin Square variation. The subsets may be generated without considering whether a backend is available or unavailable.

To ensure that the subset sizes are approximately the same size, at step 320, a determination is made whether subset sizes in a round differ by more than a threshold value. The threshold value may be any set number, generally speaking, greater than 1. The determination may be made by a frontend. In some embodiments, the network controller may make the determination. The rebalancing process can be supported by a network controller, for example, when machines are known to be unavailable. If the subset size imbalance does not exceed the threshold, no balancing is performed.

If the subset sizes in the round exceed the threshold value, at step 330, the backends may be transferred among the subsets in the round until the difference between the size of the largest subset and the smallest subset in the round is less than or equal to a threshold value, for example, ≤1.

Figure 4:
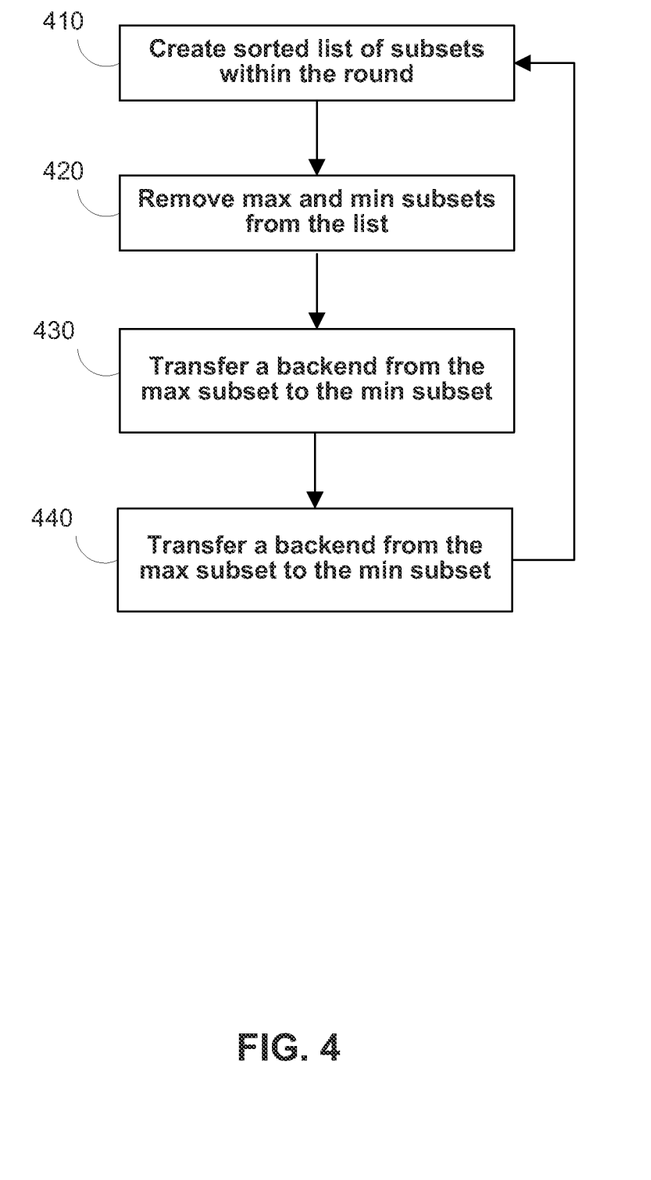

Transferring the backend servers to rebalance the subsets may be achieved using the process shown in FIG. 4. At step 410, a list of the subsets (omitting the unavailable backends) within the round may be sorted using, for example, sort key: <#backendelements, subset index within round> and (max subset size−min subset size>1).

At step 420, subsets having a maximum subset size and minimum subset size may be removed from the list. For example, the subset having the greatest number of backends and the subset having the lowest number of backends may be removed. At step 430 a backend may be transferred between the removed subsets—from the max subset which has the greatest number of backends to the min subset which has the lowest number of backends. Generally speaking, a suitable backend for transferring between the max and min subset may be a backend that is present in the max subset but not in the min subset. The rebalancing process may be continued by reinserting the new max and min subsets with the transferred backend into the list at step 440 and re-sorting the list at step 410.

An example of rebalancing according to the process shown in FIG. 4 follows. Each frontend may be allocated a subset of backends using a Latin Square variation, as discussed above to obtain the assignments shown in Table D.

TABLE D

Backend subsets in each Frontend Round

| Frontend Round | Backends |
|---|---|
| Frontend0 | 7 8 0 1 2 |
| Frontend1 | 3 4 5 6 7 |
| Frontend2 | 1 2 3 4 5 |
| Frontend3 | 4 5 6 7 8 |
| Frontend4 | 5 6 7 8 0 |
| Frontend5 | 2 3 4 5 6 |
| Frontend6 | 6 7 8 0 1 |
| Frontend7 | 0 1 2 3 4 |
| Frontend8 | 8 0 1 2 3 |

If backends 6, 7, and 8 are unavailable, Table D becomes:

| Frontend Round | Backends |
|---|---|
| Frontend0 | ~~7 8~~ 0 1 2 |
| Frontend1 | 3 4 5 ~~6 7~~ |
| Frontend2 | 1 2 3 4 5 |
| Frontend3 | 4 5 ~~6 7 8~~ |
| Frontend4 | 5 ~~6 7 8~~ 0 |
| Frontend5 | 2 3 4 5 ~~6~~ |
| Frontend6 | ~~6 7 8~~ 0 1 |
| Frontend7 | 0 1 2 3 4 |
| Frontend8 | ~~8~~ 0 1 2 3 |

Resorting the frontend list based on the number of elements in the subset, using the frontend index as a tiebreaker, the list becomes:

| Frontend Round | Backends |
|---|---|
| Frontend2 | 1 2 3 4 5 |
| Frontend7 | 0 1 2 3 4 |
| Frontend5 | 2 3 4 5 ~~6~~ |
| Frontend8 | ~~8~~ 0 1 2 3 |
| Frontend0 | ~~7 8~~ 0 1 2 |
| Frontend1 | 3 4 5 ~~6 7~~ |
| Frontend3 | 4 5 ~~6 7 8~~ |
| Frontend4 | 5 ~~6 7 8~~ 0 |
| Frontend6 | ~~6 7 8~~ 0 1 |

The subset having the most backends—in this example, Frontend2—may transfer a backend to the subset having the least backends—in this example Frontend6. A suitable backend for transferring between Frontend2 and Frontend6 may be 2, 3, 4 or 5 which are not present in Frontend6. Using the backend index to select a suitable backend, backend2 may be transferred to Frontend6. Frontend2 now has backends 1, 3, 4 and 5 and Frontend6 now has backends 0, 1 and 2. The resorted list becomes:

| Frontend Round | Backends |
|---|---|
| Frontend7 | 0 1 2 3 4 |
| Frontend2 | 1 ~~2~~ 3 4 5 |
| Frontend5 | 2 3 4 5 ~~6~~ |
| Frontend8 | ~~8~~ 0 1 2 3 |
| Frontend0 | ~~7 8~~ 0 1 2 |
| Frontend1 | 3 4 5 ~~6 7~~ |
| Frontend6 | ~~6 7 8~~ 0 1 2 |
| Frontend3 | 4 5 ~~6 7 8~~ |
| Frontend4 | 5 ~~6 7 8~~ 0 |

Since the size of the max and min subsets differs by more than 1 (Frontend7 has five backends and Frontend 4 has two backends), another backend may be transferred from the max subset to the min subset. In this iteration of the example, backends 1, 2, 3, or 4 may be suitable for transfer from Frontend7 to Frontend 4. If backend1 is transferred based on its index, the assignments become:

| Frontend Round | Backends |
|---|---|
| Frontend7 | 0 ~~1~~ 2 3 4 |
| Frontend2 | 1 ~~2~~ 3 4 5 |
| Frontend5 | 2 3 4 ~~5~~ ~~6~~ |
| Frontend8 | ~~8~~ 0 1 2 3 |
| Frontend0 | ~~7 8~~ 0 1 2 |
| Frontend1 | 3 4 5 ~~6 7~~ |
| Frontend6 | ~~6 7 8~~ 0 1 2 |
| Frontend3 | 4 5 ~~6 7 8~~ |
| Frontend4 | 5 ~~6 7 8~~ 0 1 |

The new assignments may be resorted to obtain the following list:

| Frontend Round | Backends |
|---|---|
| Frontend2 | 1 ~~2~~ 3 4 5 |

-continued

| Frontend Round | Backends |
|---|---|
| Frontend5 | 2 3 4 5 ~~6~~ |
| Frontend7 | 0 ~~1~~ 2 3 4 |
| Frontend8 | ~~8~~ 0 1 2 3 |
| Frontend0 | ~~7 8~~ 0 1 2 |
| Frontend1 | 3 4 5 ~~6 7~~ |
| Frontend4 | 5 ~~6 7 8~~ 0 1 |
| Frontend6 | ~~6 7 8~~ 0 1 2 |
| Frontend3 | 4 5 ~~6 7 8~~ |

Since the difference between the new max and min subset exceeds one—there are four backends for frontend2 compared to two backends for frontend 3—a backend is transferred from frontend2 to frontend 3. Backend1 is the first backend assigned to frontend2 that does not exist in the subset for frontend3, so it will be transferred. The new list becomes:

| Frontend Round | Backends |
|---|---|
| Frontend2 | ~~1~~ 2 3 4 5 |
| Frontend5 | 2 3 4 5 ~~6~~ |
| Frontend7 | 0 ~~1~~ 2 3 4 |
| Frontend8 | ~~8~~ 0 1 2 3 |
| Frontend0 | ~~7 8~~ 0 1 2 |
| Frontend1 | 3 4 5 ~~6 7~~ |
| Frontend4 | 5 ~~6 7 8~~ 0 1 |
| Frontend6 | ~~6 7 8~~ 0 1 2 |
| Frontend3 | 4 5 ~~6 7 8~~ 1 |

Which, upon resorting, becomes:

| Frontend Round | Backends |
|---|---|
| Frontend5 | 2 3 4 5 ~~6~~ |
| Frontend7 | 0 ~~1~~ 2 3 4 |
| Frontend8 | ~~8~~ 0 1 2 3 |
| Frontend0 | ~~7 8~~ 0 1 2 |
| Frontend1 | 3 4 5 ~~6 7~~ |
| Frontend2 | ~~1 2~~ 3 4 5 |
| Frontend3 | 4 5 ~~6 7 8~~ 1 |
| Frontend4 | 5 ~~6 7 8~~ 0 1 |
| Frontend6 | ~~6 7 8~~ 0 1 2 |

The difference between the max and min subsets—Frontend5 compared to Frontend6—is one. Thus, the subsets are substantially equally balanced and the rebalancing of the subsets is completed. The process may end.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the systems described herein focused on rebalancing frontend and backend servers, the same concepts may be applied to load balancing on other devices in other types of environments.

Moreover, while series of steps have been described with regard to FIGS. 2-4, the order of the steps may be varied in other implementations consistent with the invention. Moreover, non-dependent steps may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for balancing subsets of backend servers, the method comprising:
    assigning, using a network controller, an index number to each backend server in a set of backend servers;
    allocating, for each of a plurality of frontend servers, a respective subset of the set of backend servers based on a random shuffling of the index numbers assigned to the backend servers, wherein the allocating includes:
        determining a subset size that is a desired number of backend servers in a subset,
            dividing the plurality of frontend servers into rounds, each round having a number of frontend servers less than or equal to a number of backend servers in the set of backend servers divided by the subset size, and
            for each round, generating a shuffled ordering of the index numbers for the set of backend servers and deterministically assigning each frontend server in the round to a respective subset of backend servers using the shuffled ordering;
    determining that a size of a first subset of backend servers differs from a size of a second subset of backend servers; and
    transferring a backend server in the first subset of backend servers to the second subset of backend servers.

2. The method of claim 1 further comprising identifying a backend server in the first subset of backend servers that is not included in the second subset of backend servers.

3. The method of claim 2 wherein the transferring a backend server comprises transferring the identified backend server from the first subset of backend servers to the second subset of backend servers.

4. The method of claim 2 further comprising identifying the backend server based on its respective index number.

5. The method of claim 1 wherein the first subset of backend servers comprises a subset having a greatest number of backend servers, and the second subset of backend servers comprises a subset having a lowest number of backend servers.

6. The method of claim 5 wherein the first subset of backend servers comprises a subset having the greatest number of backend servers and a lowest subset index number, and the second subset of backend servers comprises a subset having the lowest number of backend servers and a highest subset index number.

7. The method of claim 1 further comprising repeating the determining step and the transferring step until the difference in a size of the first subset of backend servers and the second set of backend servers meets a threshold value.

8. The method of claim 7 wherein the threshold value is 1.

9. A system for balancing subsets of backend servers, the system comprising:
a set of backend servers, each assigned an index number;
a network controller comprising a computer processor configured to:
allocate, for each of a plurality of frontend servers, a respective subset of the set of backend servers based on a random shuffling of the index numbers assigned to the backend servers, wherein the allocating includes:
determining a subset size that is a desired number of backend servers in a subset,
dividing the plurality of frontend servers into rounds, each round having a number of frontend servers less than or equal to a number of backend servers in the set of backend servers divided by the subset size, and
for each round, generating a shuffled ordering of the index numbers for the set of backend servers and deterministically assigning each frontend server in the round to a respective subset of backend servers using the shuffled ordering;
determine that a size of a first subset of backend servers differs from a size of a second subset of backend servers; and
transfer a backend server in the first subset of backend servers to the second subset of backend servers.

10. The system of claim 9 wherein the network controller is further configured to identify a backend server in the first subset of backend servers that is not included in the second subset of backend servers.

11. The system of claim 10 wherein the transferring a backend server comprises transferring the identified backend server from the first subset of backend servers to the second subset of backend servers.

12. The system of claim 10 wherein the network controller is further configured to identify the backend server based on its respective index number.

13. The system of claim 9 wherein the first subset of backend servers comprises a subset having a greatest number of backend servers, and the second subset of backend servers comprises a subset having a lowest number of backend servers.

14. The system of claim 13 wherein the first subset of backend servers comprises a subset having the greatest number of backend servers and a lowest subset index number, and the second subset of backend servers comprises a subset having the lowest number of backend servers and a highest subset index number.

15. The system of claim 9 wherein the network controller is further configured to repeat the determining step and the transferring step until a difference in a size of the first subset of backend servers and the second set of backend servers meets a threshold value.

16. The system of claim 15 wherein the threshold value is 1.

17. The method of claim 1, wherein generating the shuffled ordering in a particular round comprises using a random number generator seeded with a value corresponding to the particular round.

18. The method of claim 1, wherein the desired number of backend servers in a subset is an integer multiple of a minimum subset size.

19. The system of claim 9, wherein generating the shuffled ordering in a particular round comprises using a random number generator seeded with a value corresponding to the particular round.

20. The system of claim 9, wherein the desired number of backend servers in a subset is an integer multiple of a minimum subset size.

\* \* \* \* \*